Dec. 22, 1925.
L. H. MILES
1,566,763
SIREN AND ATTACHING MEANS THEREFOR
Filed June 8, 1925
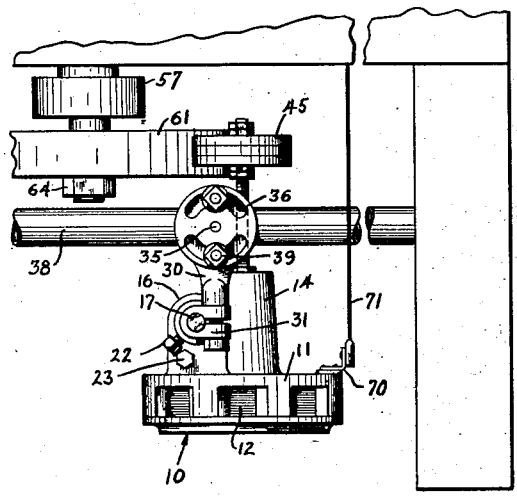
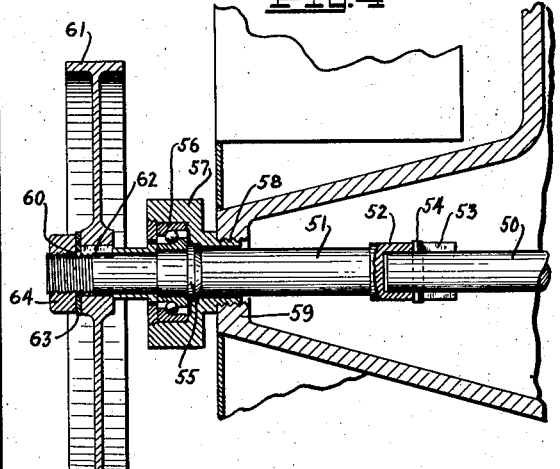
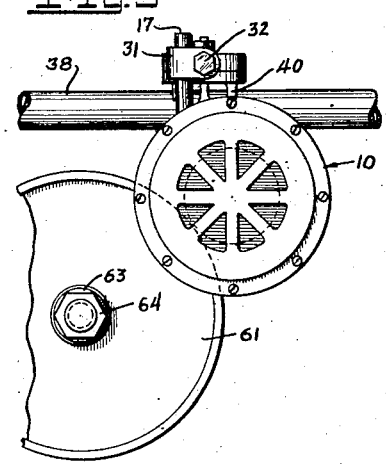
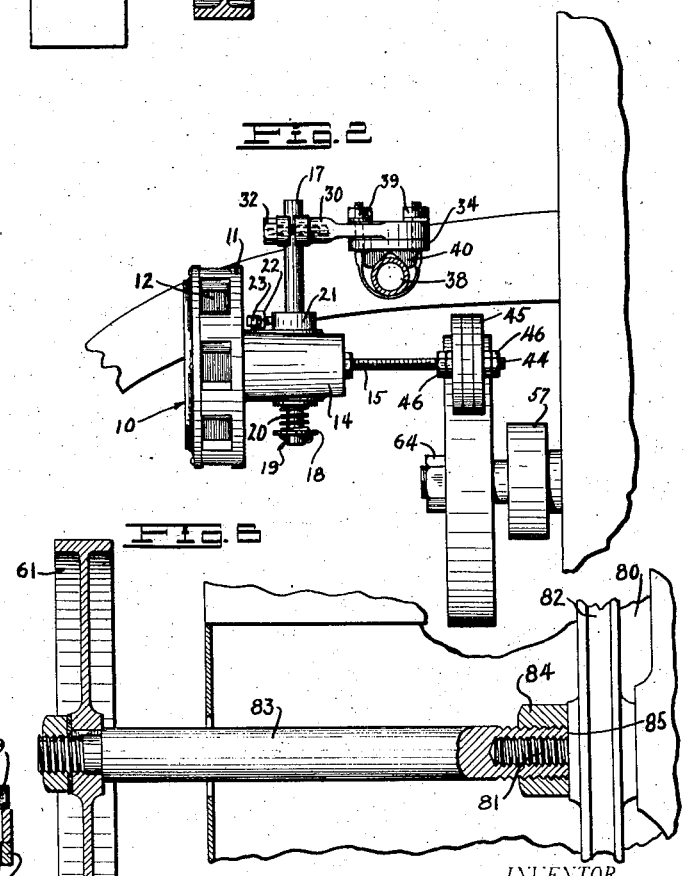
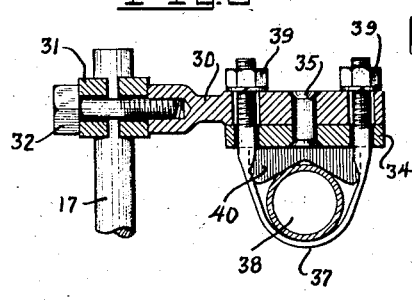
INVENTOR.
*LESTER H. MILES*
BY
ATTORNEY.

Patented Dec. 22, 1925.

1,566,763

UNITED STATES PATENT OFFICE.

LESTER H. MILES, OF LOS ANGELES, CALIFORNIA.

SIREN AND ATTACHING MEANS THEREFOR.

Application filed June 8, 1925. Serial No. 35,610.

*To all whom it may concern:*

Be it known that I, LESTER H. MILES, a citizen of the United States, residing at Los Angeles, in the county of Los Angeles and State of California, have invented a certain new and useful Improvement in Sirens and Attaching Means Therefor, of which the following is a full, clear, and exact description, reference being had to the accompanying drawings.

This invention relates to sirens and attaching means therefor.

The general object of the invention is to provide a novel form of attaching means for sirens whereby a siren may be driven from the crank shaft of an automobile engine.

A specific object of the invention is to provide a siren driving means which is adapted to be operated from the crank shaft of an automobile engine and wherein means is provided for intermittently operating the siren.

Other objects of the invention will be apparent from the following description taken in connection with the accompanying drawings wherein Fig. 1 is a top plan view of a siren and its attaching means as shown with a portion of an automobile; Fig. 2 is a side elevation of the siren and its attaching means; Fig. 3 is a front elevation of the siren and attaching means; Fig. 4 is a central sectional view showing the crank shaft and driving means; Fig. 5 is a central detail showing the attaching clip and Fig. 6 is a central sectional view showing a modified form of attachment.

Referring to the drawing by reference characters, I have shown a siren embodying the features of my invention at 10. This siren comprises a body part 11 having a rotor 12 mounted therein. The body 11 is provided with a cylindrical extension 14 through which the shaft 15 of the rotor 12 extends. The extension 14 is provided at one side thereof with an offset portion 16 through which a stem 17 extends. The lower portion of this stem is provided with a washer 18 and a cotter pin 19 for holding the washer in position. A spring 20 surrounds the stem 17 and this spring serves to push the siren upwardly along the stem 17 and into engagement with an adjustable collar 21 which has a set screw 22 thereon. This set screw is adapted to engage a stud 23 arranged in the portion 16 to limit the rotation of the siren in one direction.

The stem 17 is shown as secured to a bracket 30 which includes at one end a split collar 31 which is adapted to be clamped into engagement with the bracket by means of a bolt 32. At the other end the bracket 30 is secured to a supporting base 34, by means of a pivot member 35. The relation of the parts is such that the bracket 30 may turn relative to the base 34 about the axis of the pivot 35. The base 34 and the end of the bracket are provided with aligning arcuate slots 36 through which the ends of a U-bolt 37 are adapted to be inserted. The base of the U-bolt is adapted to engage a supporting member 38 and when nuts 39 on each end of the U-bolt are tightened the lower portion 40 of the base 34 will be brought into firm engagement with the supporting member 38.

By adjusting the position of the bracket relative to the supporting base a correct alignment of the shaft 15 may be secured. This shaft 15 is indicated as provided with a threaded extended portion 44 which has a disc 45 thereon. This disc which may be made of vulcanized fiber is held in place by suitable nuts 46 so that it may be adjustable along the shaft 15.

In order to drive the disc 45, I provide the crank shaft 50 of the automobile with an extension shaft 51. This extension shaft 51 has a hollow boss 52 thereon which is slotted as at 53 to receive a pin 54 arranged on the crank shaft 50. The extension shaft 51 is provided with a shouldered portion 55 which engages one member of a ball race 56. This ball race 56 is shown as secured in a cupped member 57 which has a threaded extension 58 thereon. This extension is received within a threaded flange 59 which is shown as a part of the engine body.

The extension shaft 51 is provided with a slot 60 and fitted thereon is a driving disc 61. This disc 61 has a key way 62 which aligns with the slot 60 whereby it may be keyed to the extension shaft 51. The driving disc is held in place by means of a washer 63 and a nut 64.

The parts are normally so disposed that the disc 45 is arranged in engagement with the driving disc 61 so that the siren will be actuated when the crank shaft 50 rotates.

The spring 20 previously mentioned has the upper end thereof secured to the offset portion 16 while the lower end thereof is secured to the washer 18 which is held in position so that it will not rotate on the stem 17. The spring 20 is so tensioned that it tends to turn the disc 45 away from engagement with the driving disc 61. In order to bring the driving disc 45 into engagement with the driving disc 61 to actuate the siren I provide an L-shaped bracket which is secured to the casing 11. This bracket has a rod 71 secured thereto which may be pulled in any desired manner to swing the siren case 11 about the stem 17 and thus the disc 45 into engagement with the driving disc 61.

In the modification shown in Fig. 6, a portion of an automobile is shown at 80. The end of the crank shaft is shown at 81 and a fan belt pulley at 82. Threaded upon the crank shaft extension 81 I show an extension shaft 83 which has the driving disc 61 secured thereto. The driving disc 61 is shown as secured to the extension shaft 83 in the manner previously described.

The extension shaft 83 is threaded about the end 81 of the end of the crank shaft as shown. The outer portion of this extension shaft 83 is also threaded to receive a nut 84. After the extension shaft 83 has been screwed upon the end 81 until the inner end 85 thereof tightly engages the hub of the pulley 82, the nut 84 is tightened to bring it into engagement with the hub of the pulley to hold the extension shaft firmly in place.

Having thus described my invention, I claim:

1. In a device of the class described, an automobile having a crank shaft thereon, an extension shaft projecting beyond and adapted to be driven by said crank shaft, a driving disc secured upon the extension shaft, a supporting member on said automobile, a bracket secured upon said supporting member, said bracket including a base portion and an upper portion adjustable relative to the base portion, a stem mounted on said bracket and a siren mounted on said stem, said siren including a casing and a rotor therein, said casing being mounted for swinging movement, an offset portion on said casing, said stem extending through said offset portion, means to limit the rotation of said siren about the axis of said stem in one direction, a shaft for said rotor, a disc upon said rotor shaft, said last mentioned disc being positioned adjacent said driving disc and means to bring said rotor disc into engagement with the driving disc.

2. In a device of the class described, an automobile having a crank shaft thereon, an extension shaft having its inner end arranged upon and adapted to be driven by said crank shaft, means to hold said extension shaft in operative position, the outer end of said extension shaft having a threaded portion thereon, a driving disc fitted upon the said threaded portion and keyed thereto, a nut for securing said driving disc in position, a transverse supporting member on said automobile, a bracket including a base portion and an upper portion movable relative to the base portion, aligning arcuate slots in said upper portion whereby it may be adjustable, a U-bolt on said base having its arms extending through said slots, a stem adjustably mounted on said bracket and a siren mounted on said stem, said siren including a casing having a rotor therein, an offset portion on said casing, said stem extending through said offset portion, means to adjust said offset portion along said stem, means to limit the rotation of said siren about the axis of said stem in one direction, a shaft for said rotor, a disc adjustable along said rotor shaft, said disc being positioned adjacent said driving disc and means to bring said rotor disc into engagement with the driving disc.

In testimony whereof, I hereunto affix my signature.

LESTER H. MILES.